US012709527B2

(12) United States Patent
Schlink

(10) Patent No.: US 12,709,527 B2
(45) Date of Patent: Aug. 18, 2026

(54) FRONT SCANNER LEVEL FOR A MATERIAL HANDLING VEHICLE

(71) Applicant: Toyota Material Handling, Inc., Columbus, IN (US)

(72) Inventor: Alexander Philip Schlink, Indianapolis, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 525 days.

(21) Appl. No.: 18/319,404

(22) Filed: May 17, 2023

(65) Prior Publication Data

US 2023/0373770 A1 Nov. 23, 2023

Related U.S. Application Data

(60) Provisional application No. 63/364,870, filed on May 17, 2022.

(51) Int. Cl.
*B66F 9/075* (2006.01)
*B66F 9/08* (2006.01)
*G05D 1/00* (2024.01)

(52) U.S. Cl.
CPC .............. *B66F 9/0755* (2013.01); *B66F 9/08* (2013.01); *G05D 1/0257* (2013.01)

(58) Field of Classification Search
CPC ........ B66F 17/003; B66F 9/08; B66F 9/0755; B66F 9/082; B66F 9/087; B66F 9/105; B66F 9/085; B66F 9/16; B66F 9/147; B66F 9/20; G05D 1/0257
USPC .......................................................... 73/866.5
See application file for complete search history.

(56) References Cited

U.S. PATENT DOCUMENTS

2019/0135598 A1* 5/2019 Agarwal .............. G05D 1/0274
2019/0235054 A1* 8/2019 Ratner .................... G01S 17/42

FOREIGN PATENT DOCUMENTS

KR 20210026927 A * 3/2021 ................ B66F 9/18

* cited by examiner

*Primary Examiner* — John E Breene
*Assistant Examiner* — Truong D Phan
(74) *Attorney, Agent, or Firm* — Husch Blackwell LLP

(57) ABSTRACT

A material handling vehicle including a sensor leveling apparatus is provided. The leveling apparatus extends outwardly from an underbody panel of the material handling vehicle. The apparatus includes a frame defined by a first arm, a second arm, a mast coupling plate, and a sensor. The mast coupling plate is positioned between the first and second arms and is coupled to a mast of the material handling vehicle. The sensor is positioned forward and above the mast coupling plate and between the first and second arms and coupled to the mast coupling plate. The sensor is configured to move in the opposite direction of the mast coupling plate in response to the mast of the material handling vehicle being protracted and retracted.

20 Claims, 11 Drawing Sheets

FRONT SCANNER LEVEL FOR A MATERIAL HANDLING VEHICLE

RELATED APPLICATIONS

This application claims priority to U.S. Provisional Application No. 63/364,870, filed on May 17, 2022, the entire disclosure of which is incorporated herein by reference.

BRIEF SUMMARY

This disclosure generally relates to an advanced material handling vehicle. More specifically, the disclosure relates to an advanced material handling vehicle equipped with a front scanner leveling apparatus.

BACKGROUND

A conventional material handling vehicle, such as a forklift, has a mast provided on its body, and a carriage having a load carrying apparatus, such as forks, wherein the load carrying apparatus is designed to be liftable along the mast. The mast may be a multi-level mast. At the time of performing a load pickup or load drop off at a high place in a rack, a driver operates a load handling lever to protract or retract the multi-level mast by hydraulic actuation to move the forks upward along the mast to position the load carrying apparatus to a pallet in the rack or a shelf surface. It can be difficult for the driver to see their surroundings while the mast is raised.

It may also be necessary for a driver to transport a load from one location to another location. However, with the load on the forks, the driver's line of vision may be blocked or impaired. This may create a visual impediment because, within the environment of the warehouse, there are obstacles such as pallets, other material handling vehicles, narrow spaces, and workers, all of which must be accounted for and navigated around to prevent bodily harm or property damage.

SUMMARY

To detect these hazards, material handling vehicles may use a scanner or sensor, such as 2D LiDAR. To be able to accurately detect hazards, the sensor should be positioned parallel to the ground and a bottom plane defined by a bottom surface of the material handling vehicle. However, if the sensor is installed on the mast, the angle of the sensor, with respect to the ground and the bottom plane of the material handling vehicle, may shift as the mast is tilted. The angle of the sensor may change because the mast is tilted at an angle with respect to the ground and the bottom plane of the material handling vehicle when the mast is protracted and retracted. If the sensor is angled toward the ground or angled up into the air, then the sensor may not be able to accurately detect potential hazards.

As such, there is a need for an advanced material handling vehicle having a sensor and associated level mechanism that is designed to remain parallel with respect to a bottom plane of the material handling vehicle and the ground during mast tilt so that the sensor can accurately detect hazards and permit the driver to safely navigate the material handling vehicle around a geographic location, such as a warehouse.

A first material handling vehicle is provided. The first material handling vehicle includes a body having an underbody panel, a mast tiltably engaged with the body, and a sensor engaged with the body and the mast. The sensor has a top surface, whereby the top surface us designed to remain substantially parallel to the underbody panel when the mast tilts relative to the body of the material handling vehicle.

In some embodiments of the first material handling vehicle, the sensor is vertically and horizontally translatable relative to the body and the sensor is non-rotatable relative to the body.

In some embodiments of the first material handling vehicle, the sensor is rotatable relative to the mast.

In some embodiments of the first material handling vehicle, the sensor is engaged with the body via a first linkage and the sensor is engaged with the mast via a second linkage.

In some embodiments of the first material handling vehicle, the first linkage includes a first linear bearing and a second linear bearing.

In some embodiments of the first material handling vehicle, the first linkage includes a leveling reference plate, the sensor is slidably engaged with the leveling reference plate via the first linear bearing, and the leveling reference plate is slidably engaged with the body via the second linear bearing.

In some embodiments of the first material handling vehicle, the first linear bearing is provided in the form of a vertical linear bearing and the second linear bearing is provided in the form of a horizontal linear bearing.

In some embodiments of the first material handling vehicle, the second linkage includes a rotational cross bar and a mast coupling plate.

In some embodiments of the first material handling vehicle, the sensor is rotatably engaged with the mast coupling plate via the rotational cross bar and the mast coupling plate is fixedly engaged with the mast.

A leveling apparatus is also provided. The leveling apparatus includes a mast coupling plate, and a first bracket rotatably engaged with the mast coupling plate and translatably engaged with a second bracket. The first bracket is maintained in a substantially fixed angular position relative to the second bracket.

In some embodiments of the leveling apparatus, the first bracket has a first top surface, the second bracket has a second top surface, and the first top surface is designed to remain parallel with the second top surface as the mast coupling plate is rotated.

In some embodiments of the leveling apparatus, the first bracket is constrained to translate only vertically and horizontally relative to the second bracket.

In some embodiments of the leveling apparatus, the second bracket is translatably engaged with the first bracket via a leveling reference plate, a first linear bearing, and a second linear bearing.

In some embodiments of the leveling apparatus, the leveling reference plate is slidably engaged with the first bracket via the first linear bearing, and the leveling reference plate is slidably engaged with the second bracket via the second linear bearing.

In some embodiments of the leveling apparatus, the first linear bearing is provided in the form of a vertical linear bearing and the second linear bearing is provided in the form of a horizontal linear bearing.

In some embodiments of the leveling apparatus, the leveling reference plate supports the first linear bearing and the second bracket supports the second linear bearing.

A second material handling vehicle is provided. The second material handling vehicle includes a body, a mast pivotably engaged with the body, whereby the mast has a lower end. A sensor is engaged with the lower end and translatably moveable relative to the body.

In some embodiments of the second material handling vehicle, the sensor translates relative to the body when the mast pivots relative to the body.

In some embodiments of the second material handling vehicle, the sensor is maintained in a substantially fixed angular position relative to the body.

In some embodiments of the second material handling vehicle, the sensor is constrained to vertical and horizontal movement relative to the body via a linkage.

Figure 1:
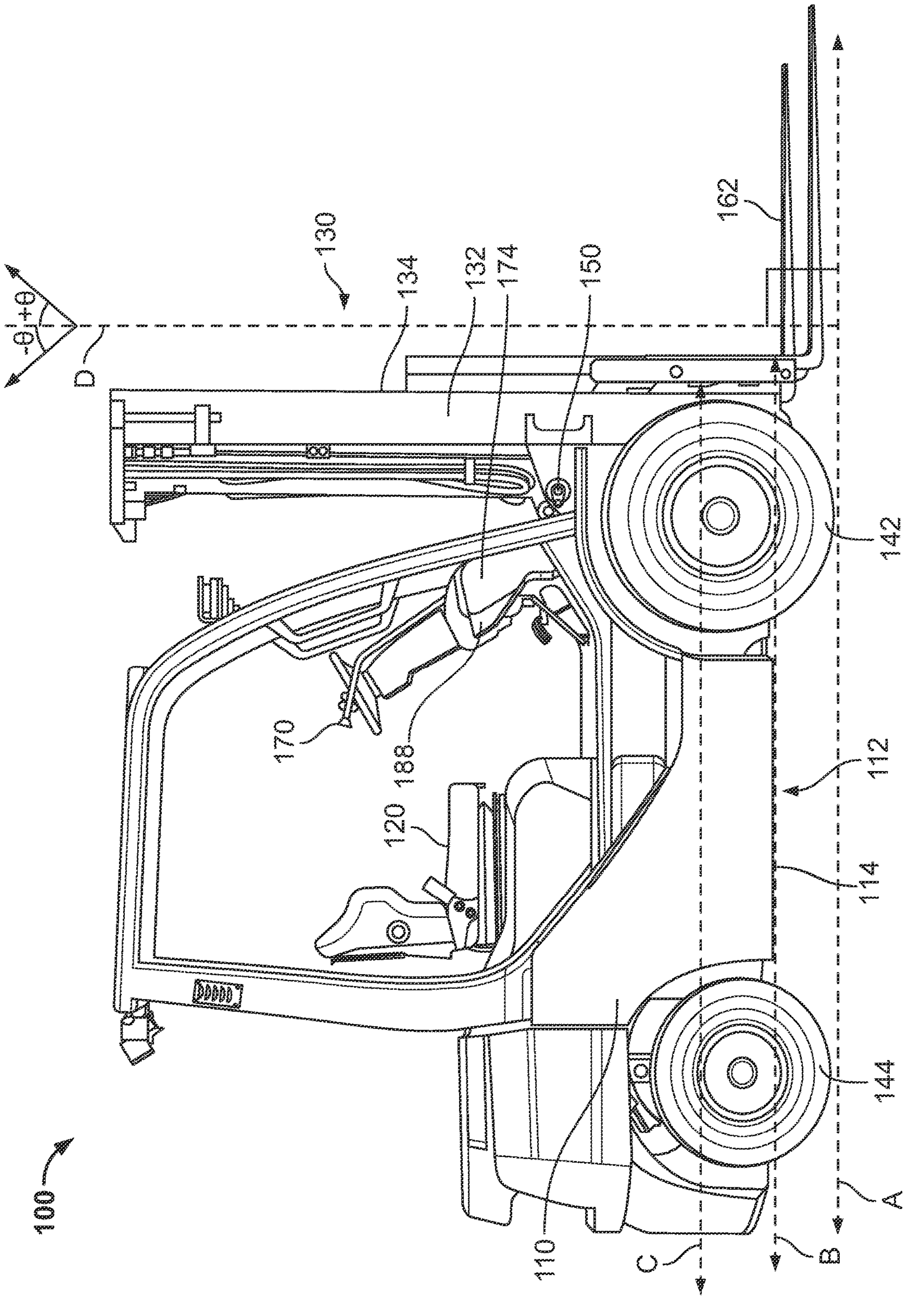
FIG. 1 is a side isometric view of a material handling vehicle according to an embodiment.

Before explaining the disclosed embodiments of the present invention in detail, it is to be understood that the invention is not limited in its application to the details of the particular arrangements shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings, but can also refer to communicative, electrical, or fluidic couplings.

Figure 2:
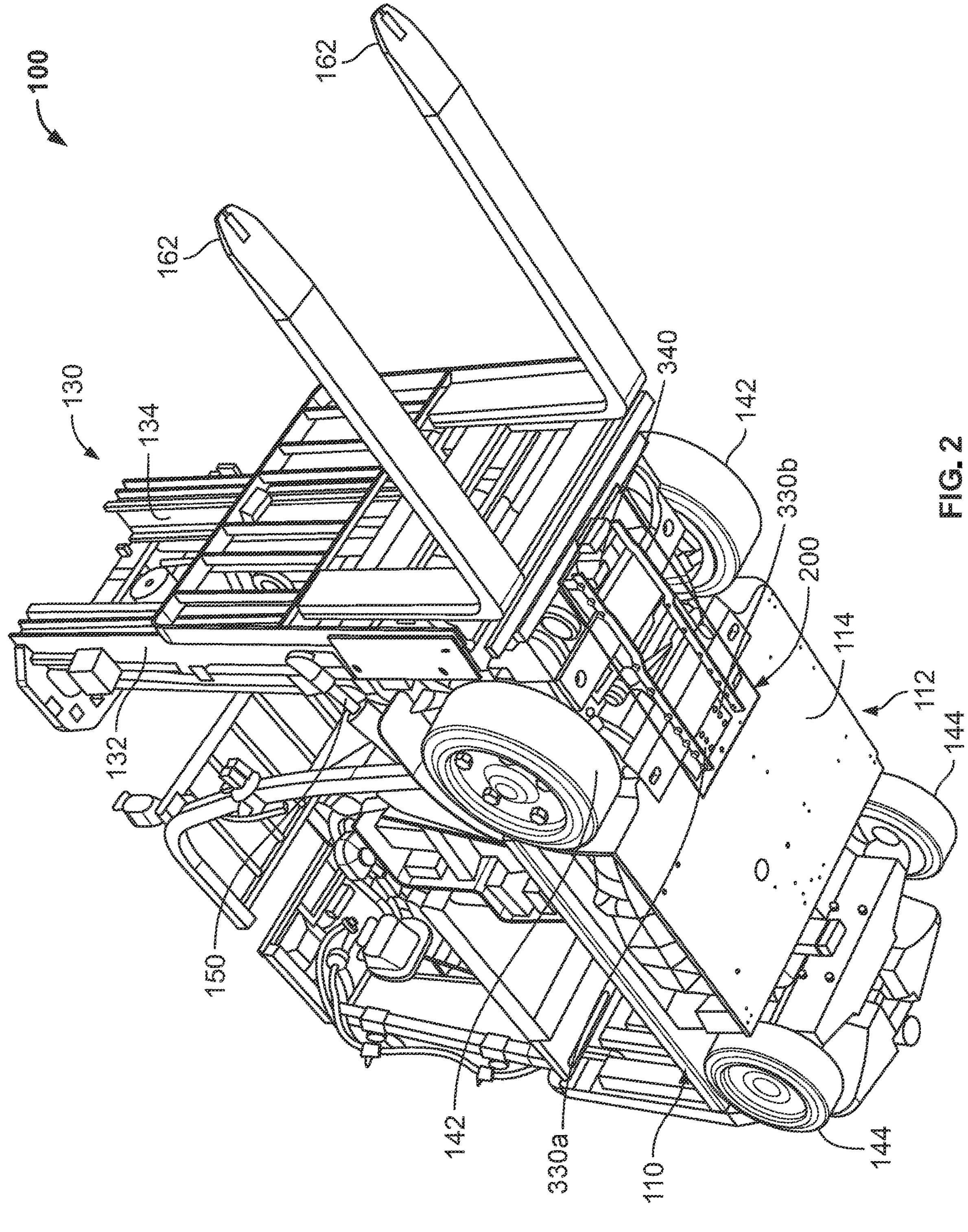
FIG. 2 is a bottom isometric view of the material handling vehicle of FIG. 1, with portions removed for clarity.

FIGS. 1 and 2 illustrate an advanced material handling vehicle according to one embodiment. Specifically, a material handling vehicle 100 is illustrated. The material handling vehicle 100 can comprise a vehicle body 110. As illustrated, in some embodiments, the material handling vehicle 100 can be operated by a driver. As shown in FIG. 1, a driver's seat 120 can be provided at a front portion of the vehicle body 110. A control lever 170 can be provided near the driver's seat 120 for controlling the material handling vehicle 100. For example, the control lever 170 can be used to shift the material handling vehicle 100 into forward or backward movements. The control lever 170 can be coupled to a main controller 174, which includes a processor, a memory, and a display 188 onboard the vehicle body 110. However, it is to be understood that the material handling vehicle 100 can alternatively be an autonomous vehicle and may comprise more or fewer components compared to the embodiment describe above.

As illustrated in FIG. 1, a mast 130 can be provided in front of the driver's seat 120. The vehicle body 110 can further be connected to sets of wheels 142 and 144 at a front portion and at a rear portion of the vehicle body 110, respectively. The front wheels 142 can be used for steering the material handling vehicle 100 or rear wheels 144 can be used for steering, or both set of wheels 142, 144 can be used for four-wheel steering. Contact points of the wheels 142 and the ground, e.g., the ground upon which the material handling vehicle 100 drives, form a first plane A. An underbody panel 112 of the vehicle body 110 includes a surface 114 that defines a second plane B that is parallel (or substantially parallel) with respect to a first plane A.

Still referring to FIG. 1, in a neutral position, the mast is positioned at an approximately 90° angle relative to the vehicle body 110, as indicated by the vertical line D. The mast 130 can be pivotably supported on a front axle associated with the front wheels 142 so that the mast 130 can be tiltable in a forward, $+\theta$, or a backward, $-\theta$, direction with respect to the vehicle body 110. In some forms, the forward tilt angle, $+\theta$, can be an angular value between about 0° and about 90°, inclusive. In some forms, the backward tilt angle, −θ, can be an angular value between about 0° and about 90°, inclusive. In some forms, the forward tilt angle +θ and the backward tilt angle −θ can be different values. The tilting of the mast 130 can be accomplished by actuating a tilt cylinder 150. The tilt cylinder 150 can retract or protract, thereby tilting tiling the mast 130. In some forms, the mast 130 can be provided in the form of a two-level slide mast that can include an outer mast 132 and an inner mast 134. The outer mast 132 can be supported on the vehicle body 110 in a tiltable manner, and the inner mast 134 can be supported on the outer mast 132 in a liftable manner. The inner mast 134 can further include a pair of forks 162 extending outwardly therefrom. Moreover, the outer mast 132 can be provided with one or more lift cylinders to lift or lower the inner mast 134 with the forks 162.

As illustrated in FIG. 2, a sensor leveling apparatus 200 is attached to the surface 114 of the underbody panel 112 of the vehicle body 110 of the material handling vehicle 100. Because the surface 114 defines the second plane B, numerous elements of the sensor leveling apparatus 200 are positioned on, or parallel to, the second plane B, shown in FIG. 1.

Figure 3:
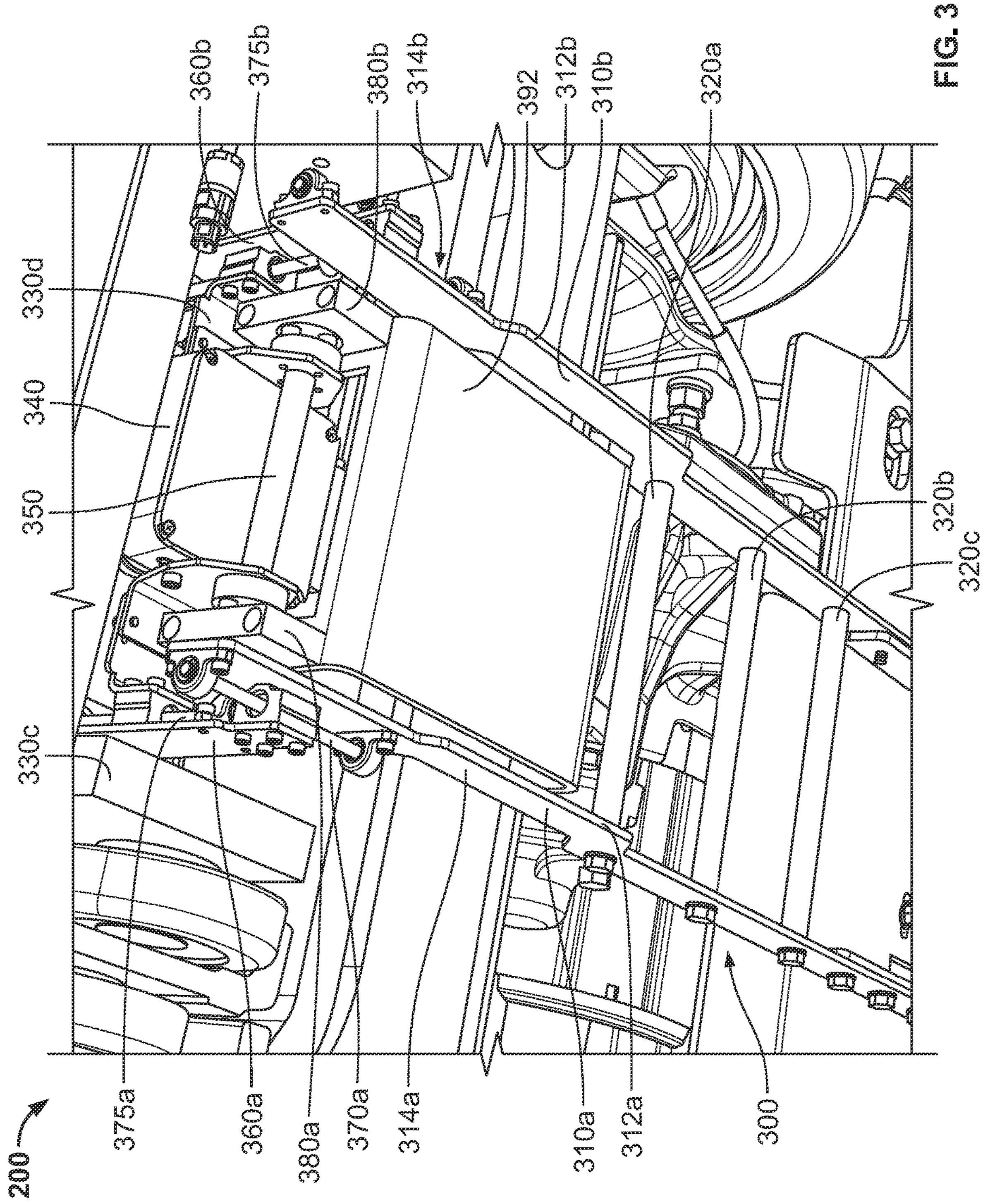
FIG. 3 is a partial bottom isometric view of the material handling vehicle of FIG. 1 showing a portion of a sensor leveling apparatus.
Figure 4:
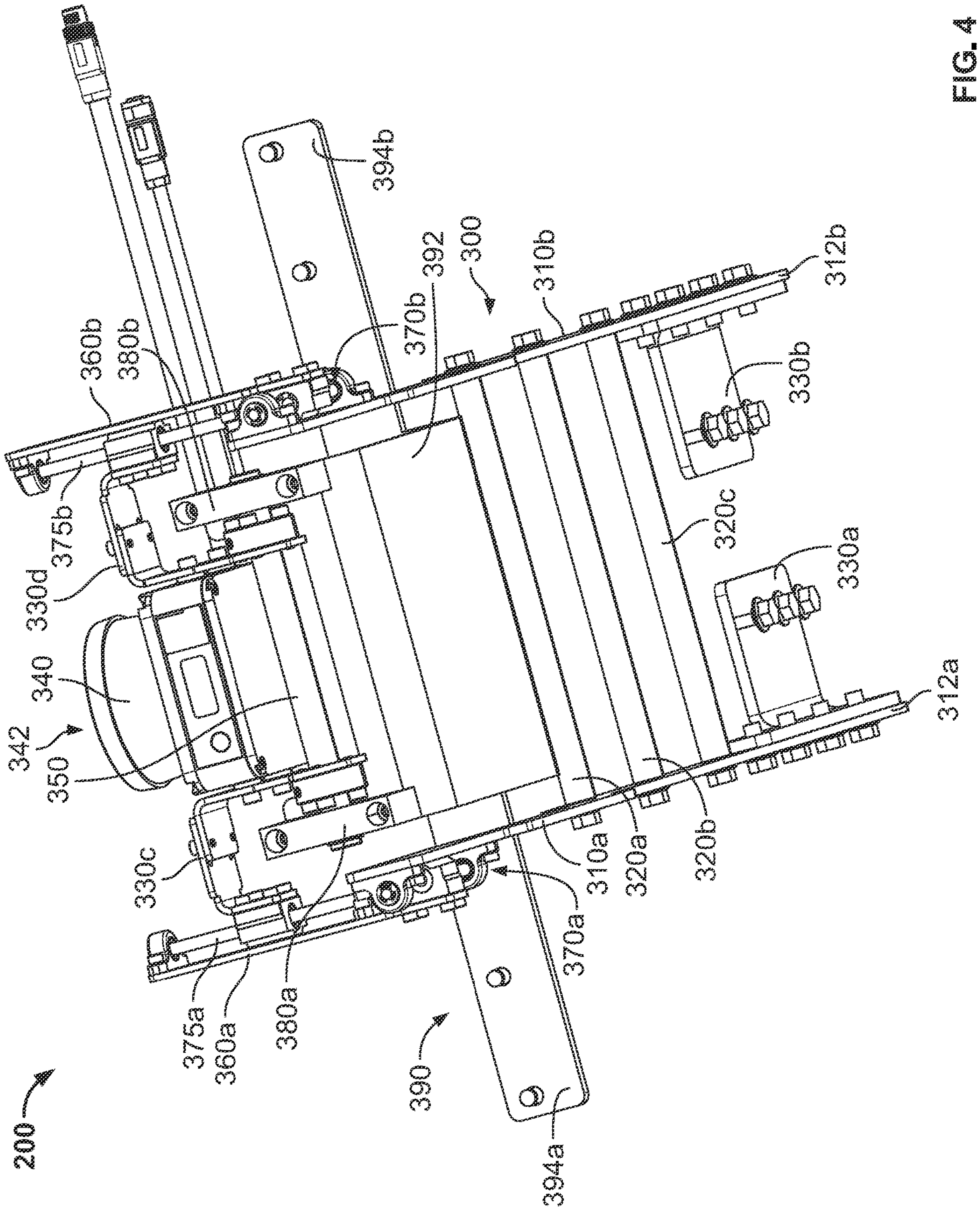
FIG. 4 is a bottom isometric view of the sensor leveling apparatus of FIG. 3.
Figure 5:
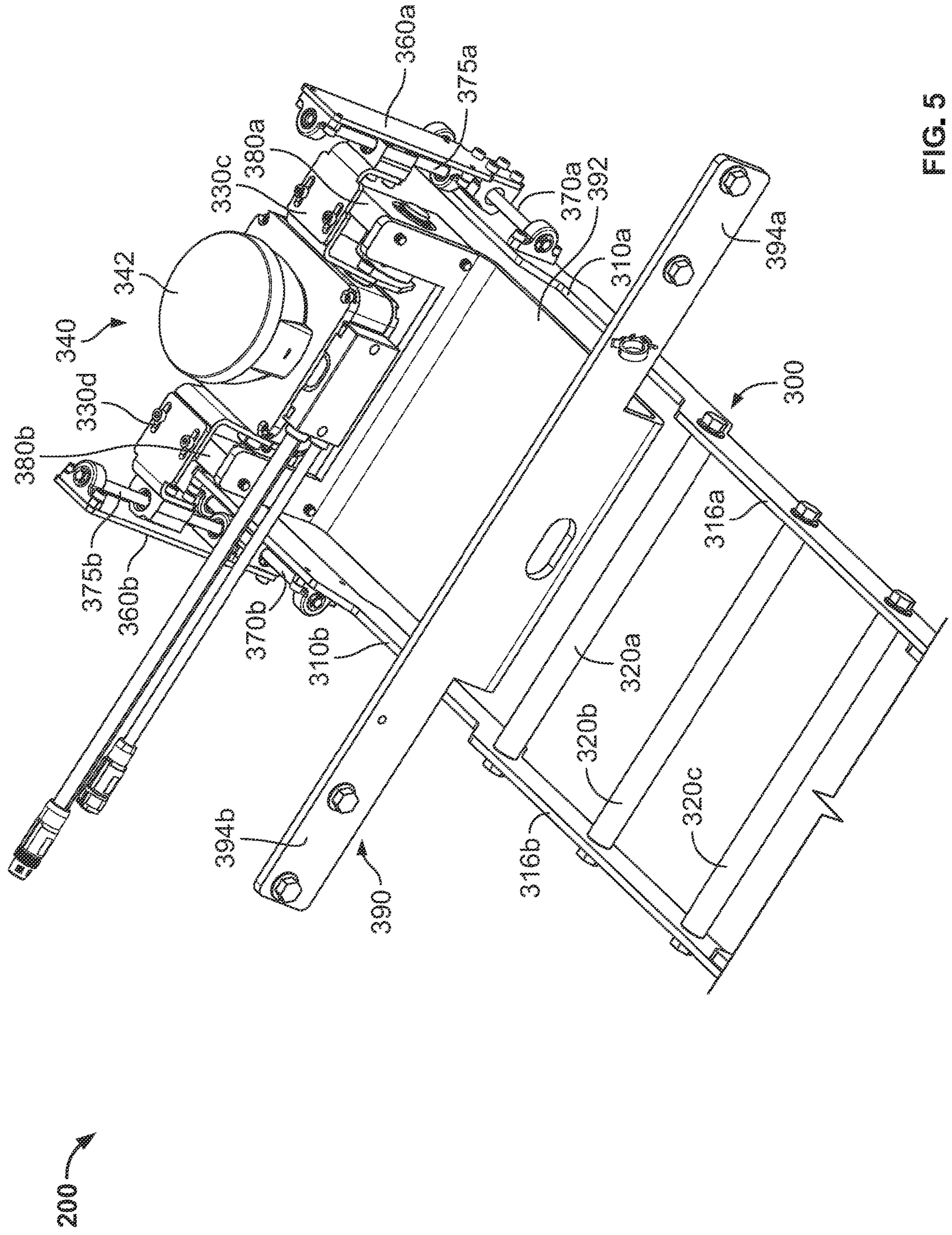
FIG. 5 is a partial top isometric view of the sensor leveling apparatus of FIG. 3.
Figure 6:
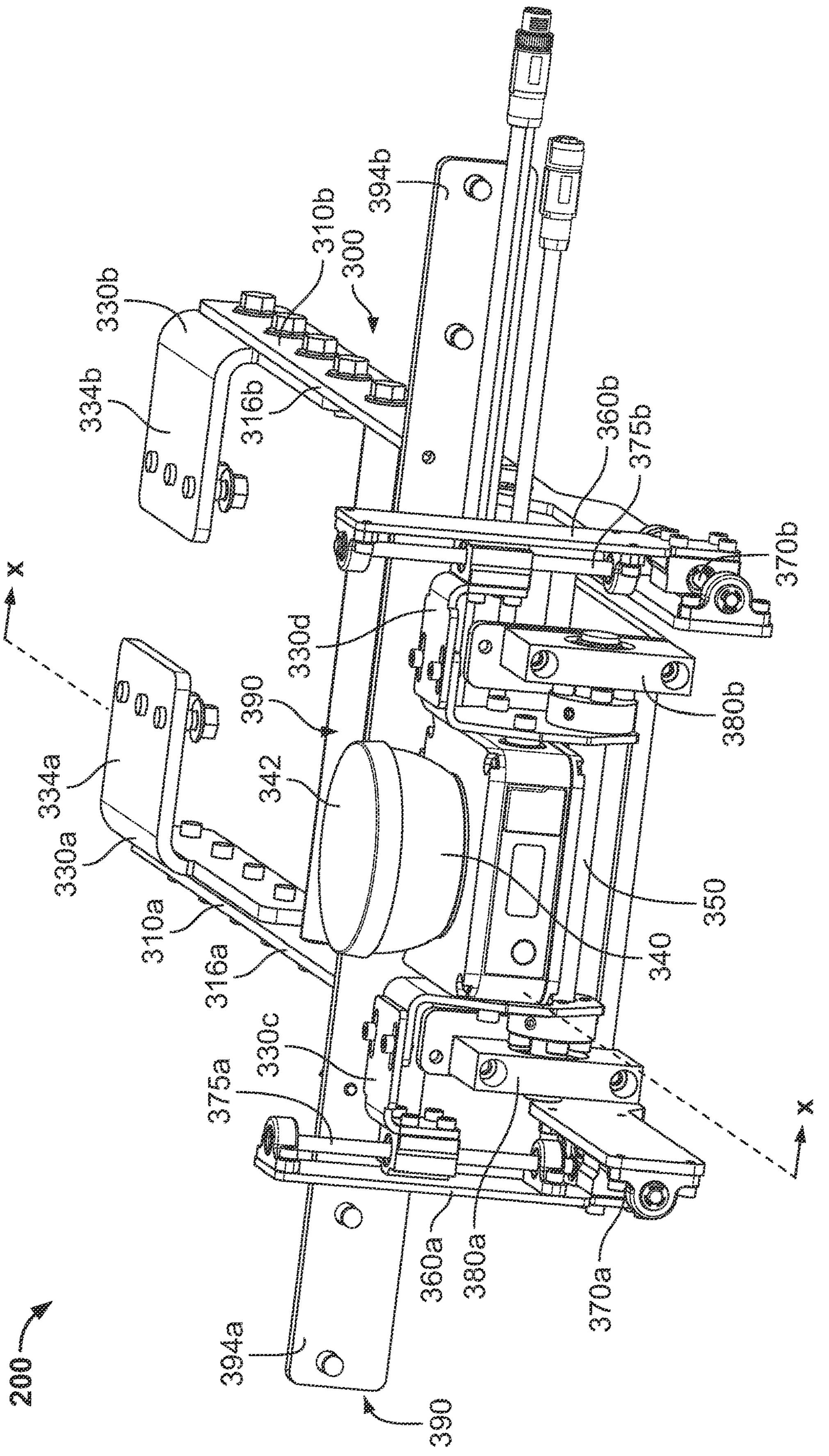
FIG. 6 is a front isometric view of the sensor leveling apparatus of FIG. 3.

As shown in FIGS. 3-7, the sensor leveling apparatus 200 includes a frame 300 and a sensor system 340 that is attached to the material handling vehicle 100 via the frame 300. The sensor system 340 is configured to detect obstacles around (e.g., in front of, and/or along the side of) the material handling vehicle 100. The frame 300 is provided in the form of a first horizontal arm 310*a* and a second horizontal arm 310*b*. The first horizontal arm 310*a* has a first bottom edge 312*a* and the second horizontal arm 310*b* has a second bottom edge 312*b*. Further, the first horizontal arm 310*a* has a first outside surface 314*a* and the second horizontal arm 310*b* has a second outside surface 314*b*. Referring to FIGS. 5 and 6, the first horizontal arm 310*a* also includes a top edge 316*a* and the second horizontal arm 310*b* includes a second top edge 316*b*.

Turning to FIG. 4, the frame 300 further includes a plurality of stationary cross bars 320*a*-320*c*, a first bracket 330*a*, a second bracket 330*b*, a third bracket 330*c*, and a fourth bracket 330*d*. The first horizontal arm 310*a* is spaced apart from, and parallel to, the second horizontal arm 310*b*. Further, the first and second horizontal arms 310*a*, 310*b*, are coupled to each other by the plurality of stationary cross bars 320*a*-320*c* that are positioned at a substantially 90° angle with respect to each of the first and second horizontal arms 310*a*, 310*b*. The frame 300 may be provided with more or fewer stationary cross bars 320*a*-320*c*. The stationary cross bars 320*a*-320*c* are designed to provide structural integrity and define the width of the frame 300.

Referring to FIGS. 4 and 6, the first bracket 330*a* extends inwardly from the first horizontal arm 310*a* and includes a first top surface 334*a*. Similarly, the second bracket 330*b* extends inwardly from the second horizontal arm 310*b* and includes a second top surface 334*b*. The frame 300 is attached to the underbody panel 112 (see FIG. 2) of the vehicle body 110 of the material handling vehicle 100 by the first bracket 330*a* and the second bracket 330*b*.

As shown in FIGS. 5 and 6, the sensor leveling apparatus 200 further includes a first leveling reference plate 360*a*, a second leveling reference plate 360*b*, a first vertical linear bearing 375*a*, and a second vertical linear bearing 375*b*. The first leveling reference plate 360*a* is coupled to the first vertical linear bearing 375*a*. The first vertical linear bearing 375*a* protrudes upwardly from, and is substantially perpendicularly coupled to, the first horizontal arm 310*a* on the opposite end of the first horizontal arm 310*a* as the first bracket 330*a*. The first leveling reference plate 360*a* is further coupled to a first horizontal rail having a first horizontal linear bearing 370*a*.

Referring again to FIGS. 5 and 6, the second leveling reference plate 360*b* is coupled to the second vertical linear bearing 375*b*. The second vertical linear bearing 375*b* protrudes outwardly from, and is substantially perpendicularly coupled to, the second horizontal arm 310*b* on the opposite end of the second horizontal arm 310*b* as the second bracket 330*b*. The second leveling reference plate 360*b* is further coupled to a second horizontal linear bearing 370*b*. As best shown in FIG. 3, the first horizontal linear bearing 370*a* is coupled to the first outside surface 314*a* of the first horizontal arm 310*a*. The second horizontal linear bearing 370*b* is coupled to the second outside surface 314*b* of the second horizontal arm 310*b*.

The sensor system 340 is coupled to the first horizontal arm 310*a* of the frame 300 via the third bracket 330*c*, the first vertical linear bearing 375*a*, the first leveling reference plate 360*a*, and the first horizontal linear bearing 370*a*. The sensor system 340 is coupled to the second horizontal arm 310*b* via the fourth bracket 330*d*, the second vertical linear bearing 375*b*, the second leveling reference plate 360*b*, and the second horizontal linear bearing 370*b*. As such, the sensor system 340 is positioned between the first and second horizontal arms 310*a*, 310*b*.

Referring further to FIGS. 5 and 6, the sensor system 340 is also rotatably coupled to a mast coupling plate 390 via a rotational cross bar 350, a first mast coupling 380*a*, and a second mast coupling 380*b*. For example, the sensor system 340 is coupled to the rotational cross bar 350, and the first mast coupling 380*a* and the second mast coupling 380*b* are also both coupled to the rotational cross bar 350. The mast coupling plate 390 is defined by a flat panel 392 and a T-shaped bracket comprising a first wing 394*a* and a second wing 394*b*. The first wing 394*a* and the second wing 394*b* extend toward the third plane C (shown in FIG. 8).

Turning to FIG. 6, the mast coupling plate 390 is designed to be securely, fixedly attached to the mast 130 at the first and second wings 394*a*, 394*b* using a plurality of bolts or other attachment mechanisms (shown in FIG. 2). In a multi-mast material handling vehicle, the mast coupling plate 390 may be attached to the outer mast 132. Thus, in operation, when the mast 130 (shown in FIG. 1) is retracted and protracted, the mast coupling plate 390 is tilted, which in turn moves the sensor system 340.

Considering the sensor leveling apparatus as a whole 200, each of the third and fourth brackets 330*c*, 330*d*, are also rotatably coupled to the rotational cross bar 350. The rotational cross bar 350 is positioned below the sensor system 340, and between the first and second horizontal arms 310*a*, 310*b*. Accordingly, the sensor system 340 is designed to rotate around an axis defined by the rotational cross bar 350.

Figure 7:
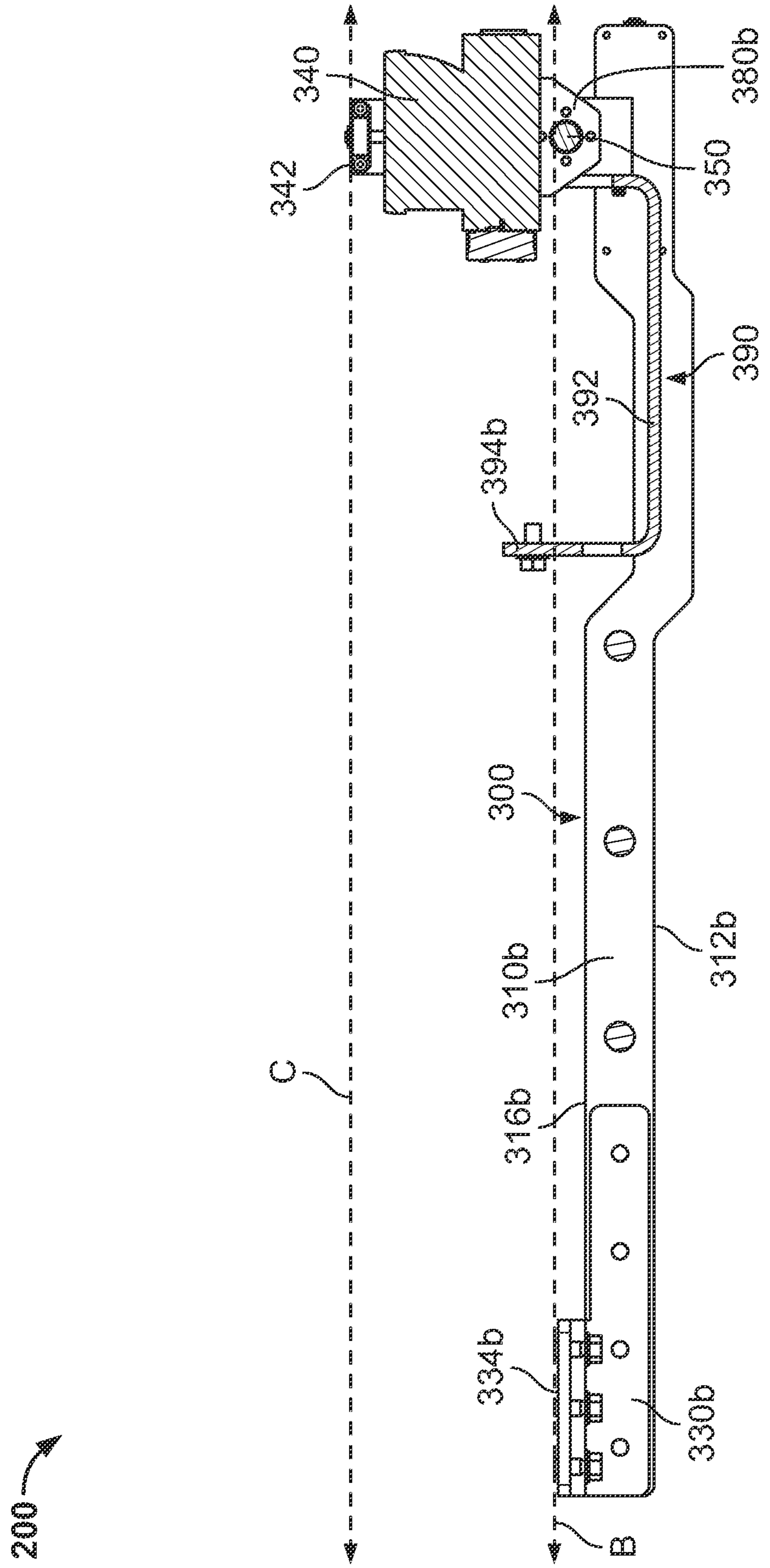
FIG. 7 is a cross-sectional view of the sensor leveling apparatus taken along line X-X of FIG. 6.

Turning to FIG. 7, when installed, the second top surface 334*b* of the second horizonal arm 310*b* is positioned on, or aligns with, plane B. Additionally, when installed, the second bottom edge 312*b* and the second top edge 316*b* of the second horizontal arm 310*b* are positioned substantially parallel to the second plane B. Although not shown in FIG. 7, similarly, when installed, the first top surface 334*a* of the first horizontal arm 310*a* is positioned on, or aligns with, plane B. Further, when installed, the first bottom edge 312*a* and the top edge 316*a* of the first horizontal arm 310*a* are positioned substantially parallel to the second plane B.

Referring further to FIG. 7, the sensor system 340 is positioned on a third plane C. The third plane C is defined by a surface that is parallel to, and above, the second plane B, and along a top surface 342 of the sensor system 340 when the mast 130 is in a mast neutral position, which is described in detail below. When installed, the sensor system 340 is provided between the forks 162 and the front wheels 142 (see FIG. 2).

Figure 8:
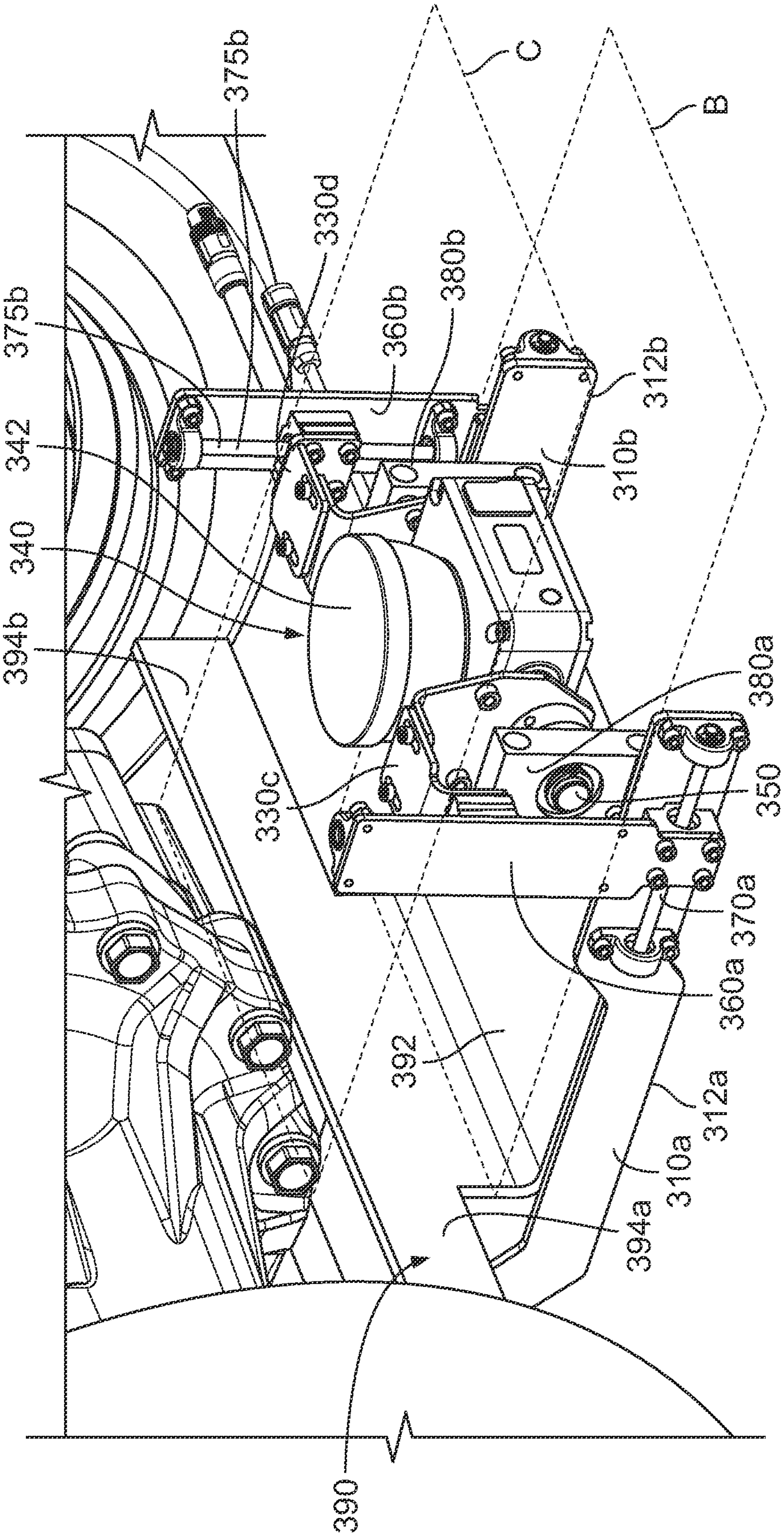
FIG. 8 is a partial front isometric view of the material handling vehicle of FIG. 1 having the sensor leveling apparatus of FIG. 3 disposed in a mast neutral position.

Turning to FIG. 8, the first horizontal linear bearing 370*a* is substantially parallel to the first horizontal arm 310*a* and/or the second plane B and third plane C. Similarly, the second horizontal linear bearing 370*b* is substantially parallel to the second horizontal arm 310*b* and/or the second plane B and third plane C. In use, the first and second horizontal linear bearings 370*a*, 370*b* permit the first and second leveling reference plates 360*a*, 360*b* and the sensor system 340 supported thereby, to translate horizontally along a portion of the first and second horizontal arms 310*a*, 310*b*, within the distance defined by a width dimension of the first and second horizontal linear bearings 370*a*, 370*b*. The first and second vertical linear bearings 375*a*, 375*b* permit the third and fourth brackets 330*c*, 330*d* and the sensor system 340 supported thereby, to slide up and down vertically along a height dimension defined by the first and second vertical linear bearings 375*a*, 375*b*.

Figure 9:
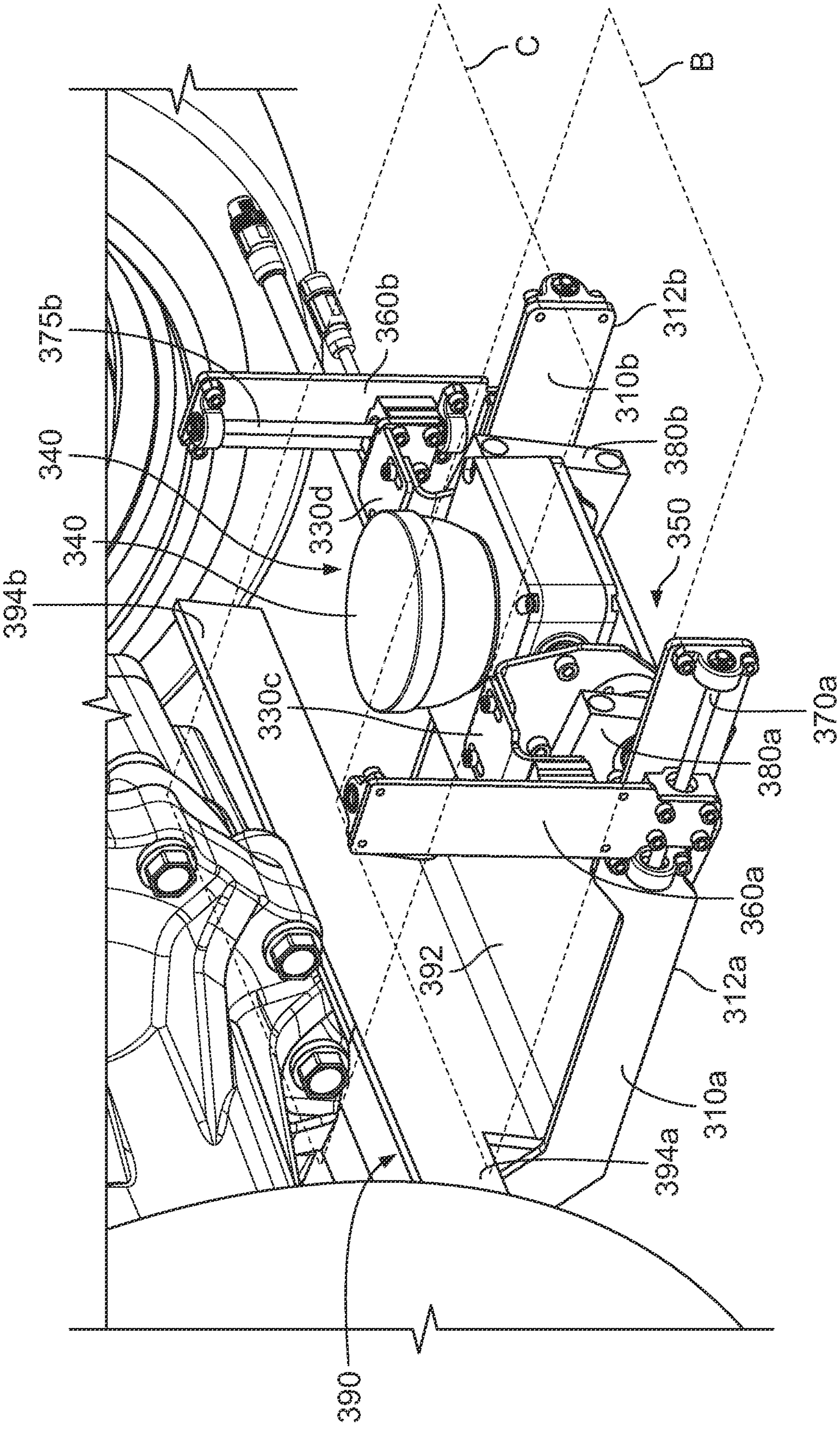
FIG. 9 is a partial front isometric view of the material handling vehicle of FIG. 1 having the sensor leveling apparatus of FIG. 3 disposed in a mast forward tilt position.
Figure 10:
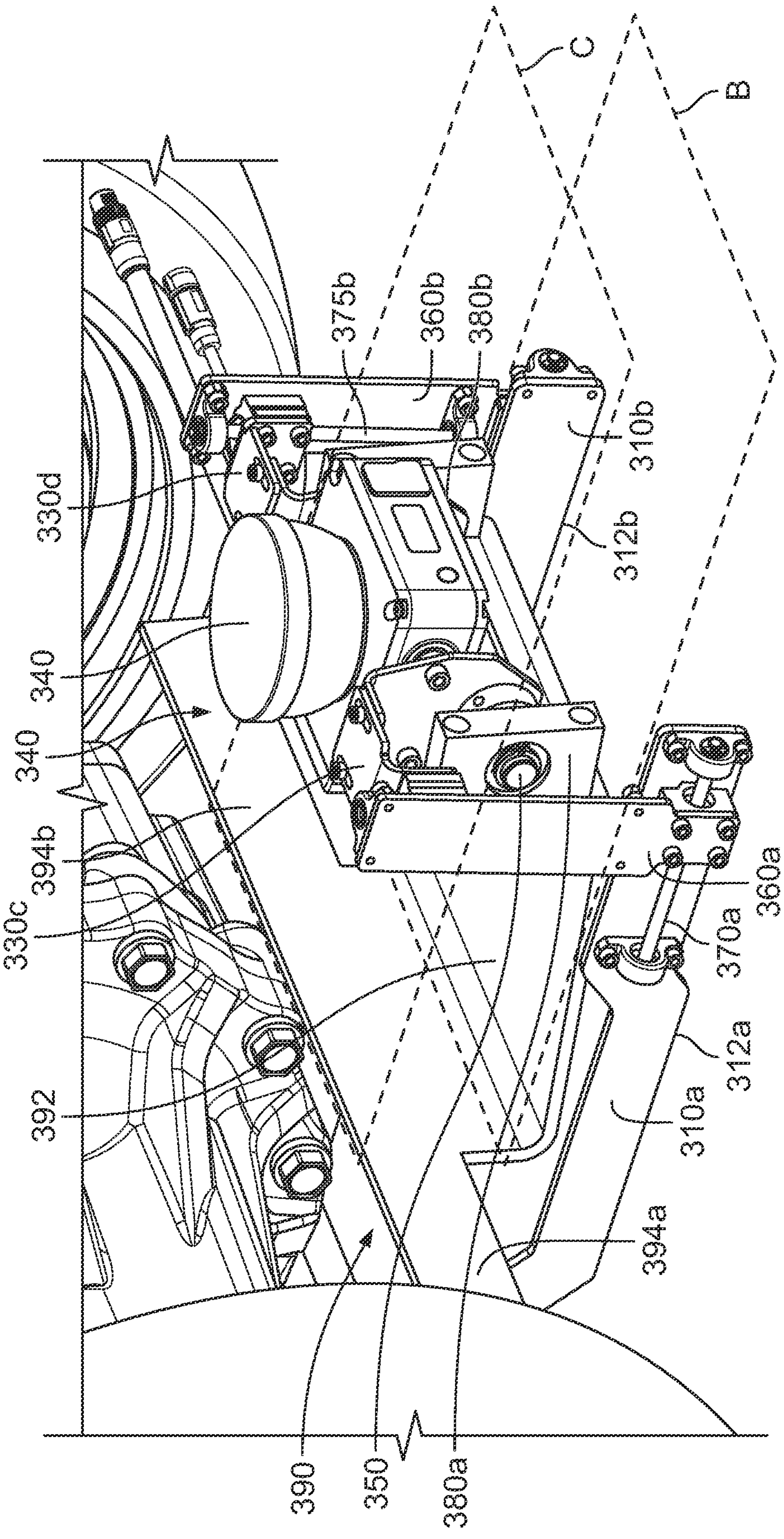
FIG. 10 is a partial front isometric view of the material handling vehicle of FIG. 1 having the sensor leveling apparatus of FIG. 3 disposed in a mast backward tilt position.

FIGS. 8-10 illustrate a partial side isometric view of the material handling vehicle 100 of FIG. 1 having the sensor leveling apparatus 200 of FIG. 3 disposed in a variety of positions with respect to the mast 130. First, FIG. 8 represents the positioning of the sensor system 340 with respect to the frame 300 when the mast 130 is positioned in the mast neutral position (see FIG. 1). In the mast neutral position, the mast 130 is positioned at an approximately 90° angle relative to the first, second, and third planes A, B, C, as indicated by the vertical line D (see FIG. 1). As illustrated in FIG. 8, in the mast neutral position, the entire flat panel 392 of the mast coupling plate 390 is positioned parallel to the second plane B. As such, the sensor system 340 is also in a neutral position. When the sensor system 340 is in a neutral position, the first and second leveling reference plates 360*a*, 360*b*, are positioned approximately medially along the width dimension of the first and second horizontal linear bearings 370*a*, 370*b*, respectively; and the third and fourth brackets 330*c*, 330*d*, are positioned approximately medially along the height dimension first and second vertical linear bearings 375*a*, 375*b*, respectively.

Referring next to FIG. 9, the mast 130 is positioned in a mast forward position. In the mast forward position, the mast 130 is positioned at an angle +θ (see FIG. 1) relative to the mast neutral position. Thus, when the mast 130 is tilted forward at an angle +θ, the sensor system 340 remains parallel to the first, second, and third planes A, B, and C. Further, in the mast forward position, the first and second leveling reference plates 360*a*, 360*b* are translated backward from medial positions along the first and second horizontal linear bearings 370*a*, 370*b* toward the aft ends of the first and second horizontal linear bearings 370*a*, 370*b* that are proximate to the mast coupling plate 390. Additionally, the third and fourth brackets 330*c*, 330*d*, are translated downwardly from medial positions along the first and second vertical linear bearings 375*a*, 375*b* toward the lower ends of the first and second vertical linear bearings 375*a*, 375*b*. Accordingly, when the mast 130 is in the mast forward position, the sensor leveling apparatus 200 prevents the sensor system 340 from being tilted forward.

In FIG. 10, the mast 130 is positioned in a mast backward position. As shown in FIG. 1, in the mast backward position, the mast 130 is positioned at an angle −θ (see FIG. 1) relative to the mast neutral position. Similar to the description above with respect to FIG. 9, due to the freely rotatable coupling between the mast coupling plate 390 relative to the sensor system 340 about the rotational cross bar 350, the constrained vertical and horizontal translation of the sensor system 340 relative to the first horizontal arm 310*a* and the second horizontal 310*b*, and the non-rotatability of the sensor system 340 relative to the first horizontal arm 310*a* and the second horizontal arm 310*b*, when the mast 130 is tilted backward at an angle −θ, the sensor system 340 remains parallel to the first, second, and third planes A, B, and C. Further, in the mast backward position, the first and second leveling reference plates 360*a*, 360*b* are translated forwardly from medial positions along the first and second horizontal linear bearings 370*a*, 370*b* toward the forward ends of the first and second horizontal linear bearings 370*a*, 370*b* that are distal to the mast coupling plate 390. The third and fourth brackets 330*c*, 330*d* are translated upwardly from medial positions along the center of the first and second vertical linear bearings 375*a*, 375*b* toward the upper ends of the first and second vertical linear bearings 375*a*, 375*b*. Accordingly, when the mast 130 is in the mast backward position, the sensor leveling apparatus 200 prevents the sensor system 340 from being tilted backward.

Accordingly, FIGS. 8-10 illustrate that in operation, the mast coupling plate 390 is freely rotatable about the rotational cross bar 350. Thus, in operation, the mast coupling plate 390 is rotatable relative to the sensor system 340, the third bracket 330*c*, and the fourth bracket 330*d*. In other words, the mast coupling plate 390 is rotatably engaged with the sensor system 340, the third bracket 330*c*, and the fourth bracket 330*d*. Further, in operation, the third bracket 330*c* is slidably engaged with the first leveling reference plate 360*a* along the first vertical bearing 375*a*. Similarly, in operation, the fourth bracket 330*d* is slidably engaged with the second leveling reference plate 360*b* along the second vertical bearing 375*b*. Thus, translation of the sensor system 340, the third bracket 330*c*, and the fourth bracket 330*d* relative to the first leveling reference plate 360*a* and the second leveling reference plate 360*b* along the first vertical linear bearing 375*a* and the second vertical linear bearing 375*b* is constrained to vertical movement.

Additionally, in operation, the first leveling reference plate 360*a* is slidably engaged with the first horizontal arm 310*a* along the first horizontal bearing 370*a*. Moreover, in operation, the second leveling reference plate 360*b* is slidably engaged with the second horizontal arm 310*b* along the second horizontal bearing 370*b*. Thus, translation of the sensor system 340, the first leveling reference plate 360*a*, and the second leveling reference plate 360*b* relative to the first horizontal arm 310*a* and the second horizontal arm 310*b* along the first horizontal linear bearing 370*a* and the second horizontal linear bearing 370*b* is constrained to horizontal movement.

Further, in operation, the sensor system 340, the third bracket 330*c*, and the fourth bracket 330*d* are translatably engaged with the first horizontal arm 310*a* and the second horizontal arm 310*b*. Also, the sensor system 340, the third bracket 330*c*, and the fourth bracket 330*d* are rotationally constrained relative to the first horizontal arm 310*a* and the second horizontal arm 310*b*. In other words, the sensor system 340, the third bracket 330*c*, and the fourth bracket 330*d* are vertically movable, horizontally movable, and maintained in a substantially fixed angular position, i.e. non-rotatable, relative to the first horizontal arm 310*a* and the second horizontal arm 310*b*.

Figure 11:
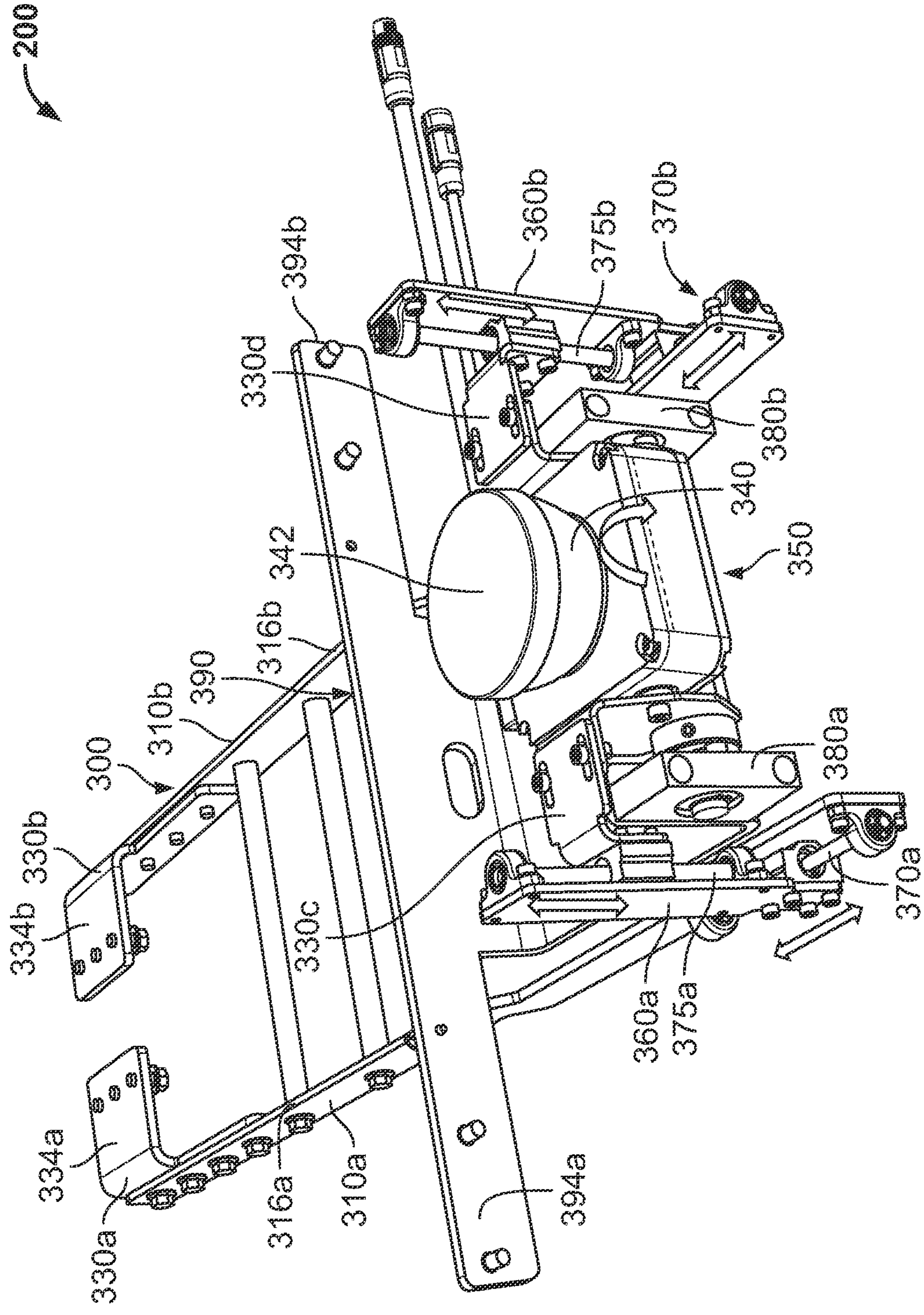
FIG. 11 is a front isometric view of the sensor leveling apparatus of FIG. 3 showing the movement of the sensor during the full range of mast tilt.

FIG. 11 depicts exemplary horizontal and vertical translation paths of the sensor system 340 and a rotation axis for the sensor system 340 relative to the mast 130 (shown in FIG. 1) during the full range of mast tilt. The first and second leveling reference plates 360*a*, 360*b* transfer the sensor system 340 across the length of the first and second horizontal linear bearings 370*a*, 370*b*, and the third and fourth brackets 330*c*, 330*d* move the sensor vertically along the height of the first and second vertical linear bearings 375*a*, 375*b*, with the rotational cross bar 350 being the rotation axis for the sensor system 340 relative to the mast 130. Thus, the sensor system 340 rotates the opposite direction of mast tilt. More particularly, the mast coupling plate 390 and the rotational cross bar 350 act as a first linkage between the mast 130 and the sensor system 340. Further, the third and fourth brackets 330*c*, 330*d*, the first and second leveling reference plates 360*a*, 360*b*, the first and second vertical linear bearings 375*a*, 375*b*, and the first and second horizontal linear bearings 370*a*, 370*b* act as second and third linkages, respectively, between the sensor system 340 and the first horizontal arm 310*a* and the second horizontal arm 310*b*.

In each of the embodiments, the sensor system 340 can be provided in the form of one or more of an individual sensor such as a camera, or a collection of sensors, including, but not limited to, a laser scanner, an accelerometer, a gyro sensor, a proximity sensor, radar, lidar, optical sensors (such as infrared sensors), acoustic sensor, barometer, thermometer, or other suitable sensors. Also, referring to FIG. 2, the sensor system 340 can be configured to detect conditions and obstacles in front of (along the side of, and/or adjacent to) the material handling vehicle 100. By way of some examples, the sensor system 340 together with a processor can determine that the material handling vehicle 100 is approaching a pallet, approaching a person, or approaching some environmental hazards (such as a step or a stair). The sensor system 340 may be connected to an alarm and/or a display to aid in alerting an operator of the material handling vehicle 100, whose field of view may be obstructed when the material handling vehicle 100 is carrying a load, that a hazard is present.

It is to be understood that although FIGS. 1 and 2 show the material handling vehicle 100 as a counterbalance-type forklift truck, this is not to be considered limiting. The material handling vehicle 100 may be provided in the form of any material handling vehicle or other vehicle used to transport materials. For example, the material handling vehicle 100 may be provided in the form of a reach truck, a stacker, a pallet truck, or an order picker.

Specific embodiments of an advanced material handling vehicle according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:

1. A material handling vehicle, comprising:
a body having an underbody panel;
a mast tiltably engaged with the body; and
a sensor engaged with the body and the mast, the sensor having a top surface, wherein the top surface remains parallel to the underbody panel when the mast tilts relative to the body.

2. The material handling vehicle of claim 1, wherein the sensor is vertically and horizontally translatable relative to the body and the sensor is non-rotatable relative to the body.

3. The material handling vehicle of claim 1, wherein the sensor is rotatable relative to the mast.

4. The material handling vehicle of claim 1, wherein the sensor is engaged with the body via a first linkage and the sensor is engaged with the mast via a second linkage.

5. The material handling vehicle of claim 4, wherein the first linkage includes a first linear bearing and a second linear bearing.

6. The material handling vehicle of claim 5, wherein
the first linkage includes a leveling reference plate;
the sensor is slidably engaged with the leveling reference plate via the first linear bearing; and
the leveling reference plate is slidably engaged with the body via the second linear bearing.

7. The material handling vehicle of claim 6, wherein the first linear bearing is provided in the form of a vertical linear bearing and the second linear bearing is provided in the form of a horizontal linear bearing.

8. The material handling vehicle of claim 4, wherein the second linkage includes a rotational cross bar and a mast coupling plate.

9. The material handling vehicle of claim 8, wherein the sensor is rotatably engaged with the mast coupling plate via the rotational cross bar and the mast coupling plate is fixedly engaged with the mast.

10. A leveling apparatus for a material handling vehicle, comprising:
a mast coupling plate;
a first bracket rotatably engaged with the mast coupling plate; and
a second bracket engaged with and vertically and horizontally translatable relative to the first bracket, wherein the first bracket is maintained in a substantially fixed angular position relative to the second bracket.

11. The leveling apparatus of claim 10, wherein the first bracket has a first top surface, the second bracket has a second top surface, and the first top surface remains parallel with the second top surface as the mast coupling plate is rotated.

12. The leveling apparatus of claim 10, wherein the first bracket is constrained to translate only vertically and horizontally relative to the second bracket via a linkage.

13. The leveling apparatus of claim 10, wherein the second bracket is translatably engaged with the first bracket via a leveling reference plate, a first linear bearing, and a second linear bearing.

14. The leveling apparatus of claim 13, wherein the leveling reference plate is slidably engaged with the first bracket via the first linear bearing and the leveling reference plate is slidably engaged with the second bracket via the second linear bearing.

15. The leveling apparatus of claim 13, wherein the first linear bearing is a vertical linear bearing and the second linear bearing is a horizontal linear bearing.

16. The leveling apparatus of claim 13, wherein the leveling reference plate supports the first linear bearing and the second bracket supports the second linear bearing.

17. A material handling vehicle, comprising:
a body;

a mast pivotably engaged with the body, the mast having an end; and a sensor pivotably engaged with the end and vertically and horizontally translatable relative to the body.

18. The material handling vehicle of claim 17, wherein when the mast pivots relative to the body and the sensor translates relative to the body.

19. The material handling vehicle of claim 17, wherein the sensor is maintained in a substantially fixed angular position relative to the body.

20. The material handling vehicle of claim 17, wherein the sensor is constrained to vertical and horizontal movement relative to the body via a linkage.

* * * * *